Jan. 19, 1954
E. J. HORKEY
2,666,603
BALANCED CONTROL SURFACE
Filed Jan. 3, 1951
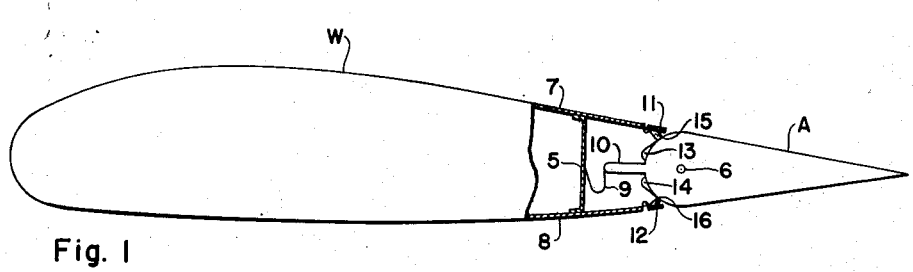
Fig. 1
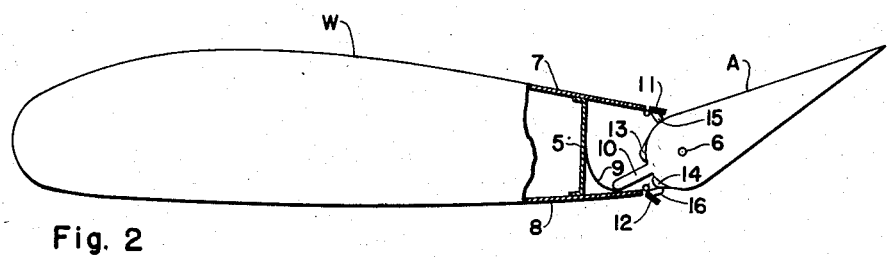
Fig. 2
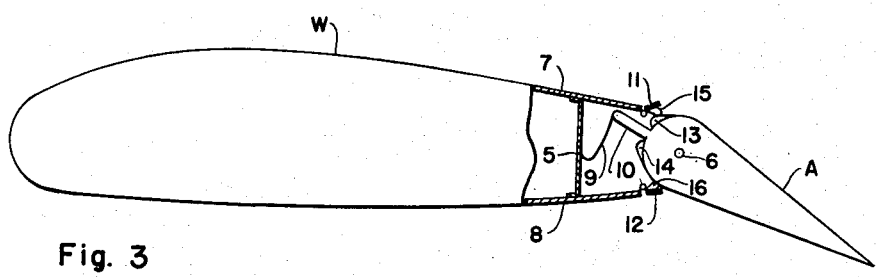
Fig. 3
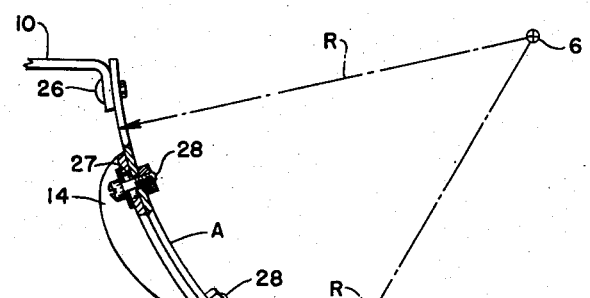
Fig. 4
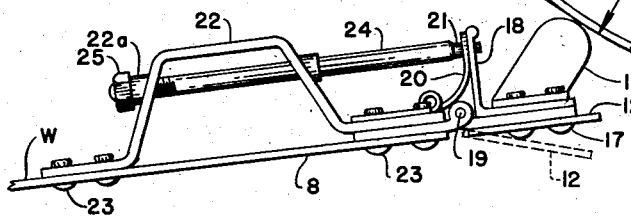
Edward J. Horkey
INVENTOR.
BY *James M. Clark*
HIS PATENT ATTORNEY.

Patented Jan. 19, 1954

2,666,603

UNITED STATES PATENT OFFICE 2,666,603

BALANCED CONTROL SURFACE

Edward J. Horkey, Rolling Hills, Calif., assignor to North American Aviation, Inc.

Application January 3, 1951, Serial No. 204,104

13 Claims. (Cl. 244—90)

The present invention relates generally to control surfaces and more particularly to improvements in means for balancing such surfaces in aircraft and like vehicles.

Numerous devices have been suggested and utilized for providing balancing forces in opposition to the aerodynamic forces to which control surfaces are subjected when displaced from their neutral or aligned positions. Among the more advantageous and successful of such balancing means finding general use in aircraft today, is the internal pressure balance type arrangement in which a seal is provided between a paddle or plate on the nose of the movable surface and the rear wall of the wing, thereby taking advantage of the differential pressures which are developed within the wing recess on the opposite sides of the sealed paddle. Such internal pressure balance arrangements have proven particularly advantageous especially in aircraft of relatively large size, or aircraft flying at higher speeds, and the use of such internal pressure balances materially relieves the pilot, as well as the control system and its actuating mechanism, of considerable fatigue and strain.

Various types of seals have been utilized in such internal pressure balance systems for control surfaces, both of the flexible curtain type and the sliding or wiping type, and there are also arrangements for correcting or modifying the balancing effects within such pressure balance installations depending to a great extent upon the desired operating characteristics to be obtained at various angles of displacement of the movable surface from its neutral position. As is well known in the art, the internally sealed balanced surface works on the principle that when the surface is deflected a pressure differential is set up across the sealed balance paddle or plate which develops forces which assist the pilot in moving the surface. It has been noted, however, that this works quite well for moderate deflections of the control surface, but generally fails at larger deflections where the hinge moment, or the pilot effort, increases too fast with surface deflection.

The present invention is directed to improved means for correcting this failure of the sealed internal balance to function effectively at large surface deflections, and it is directed to means which provide for facilitating the creation of the negative pressures developed within the pressure chamber on the side of the balance paddle or plate away from that toward which the aileron is deflected, to thereby overcome the difficulties encountered in prior systems wherein these pressures do not transmit themselves into the pressure chamber to help pull the control surface over. In a preferred form of the improved means to accomplish this result, and to alleviate or eliminate the condition prevailing in prior balanced systems, pressure regulator vanes or flaps are provided at the gaps on both surfaces of the wing and the control surface to create a larger entry or gate into the opposite pressure chamber for deflections of the control surface in either direction. Accordingly, for example, where the arrangement is applied to an aileron which may be deflected downwardly, the pressure regulator flap or vane on the upper side is deflected away from the nose of the aileron to provide a larger entry into the upper negative pressure chamber, while the regulator flap on the lower side remains in its normal position.

It is, accordingly, a major object of this invention to provide an improved internally sealed pressure balanced system for an aircraft control system. It is a further object to provide means for making the pressure balance more effective at larger deflections of the control surface. It is also an object to provide means for regulating the gaps between the control surface and the fixed wing trailing portion in such manner that the entry into the negative pressure chamber is automatically increased as the control surface is deflected. It is a still further object of this invention to provide an improved pressure regulator vane for facilitating the entry of air into or from the negative pressure chamber while at the same time not disturbing the gap on the positive pressure side of the balance.

Other forms and modifications of the present invention, both with respect to its general arrangement and the details of its respective parts, will become apparent to those skilled in the art after reading the following description, taken together with the accompanying drawings, forming a part hereof, in which:

Fig. 1 is a cross-sectional view of a wing having a control surface movably mounted at its trailing edge, with a preferred form of the present invention applied thereto, and with the control surface shown in its neutral position;

Fig. 2 is a similar view of the same with the control surface shown deflected upwardly;

Fig. 3 is a similar view of the same with the control surface deflected downwardly; and Fig. 4 is an enlarged detail view of the lower of the pressure regulator vanes shown in the previous figures.

Referring now to Figs. 1, 2 and 3, the reference letter W represents a relatively fixed wing or other airfoil to which a control surface, such as the aileron A, is pivotally mounted at its trailing portion for effecting control of the wing and the airplane in which it forms a part. It will be understood that in the form of the invention selected herein for illustration and explanation, the control surface has been indicated as an aileron, but the invention is also applicable to other control surfaces such as the elevator or the rudder of the aircraft. The numeral 5 represents the rear spar of the wing W from which is supported the aileron pivot 6 of the aileron A, which may preferably form a continuation of the upper and lower wing surfaces 7 and 8, respectively, in the neutral position of the aileron as shown in Fig. 1.

An internal pressure balance is provided for the aileron A by the flexible curtain or seal 9, attached at its leading portion to the web of the rear spar 5, and attached at its trailing portion to the balance paddle or plate 10 extending forwardly from the leading edge of the aileron A. In the case of the aileron shown in these figures, and in the normal pressure balance installation, when the aileron is deflected upwardly as shown in Fig. 2, the pressure would be increased in the upper pressure chamber above the curtain 9 and the paddle 10, while there would be a decrease in pressure within the lower chamber below the paddle and seal. This pressure differential (in Fig. 2) is such that it assists the pilot in rotating the aileron in the counterclockwise direction, thereby helping to oppose the aerodynamic forces which are imposed upon the extended upper surface of the aileron. It has, however, become a rather general experience that the negative pressures are not developed to the full extent beneath the seal and paddle 9 and 10 when the aileron is deflected upwardly as shown in Fig. 2, and it has been found that the provision of the customary small clearance gap or passage between the trailing portion of the wing surface and the leading edge of the aileron retards the flow through the gap on the negative side of the balance, thereby preventing its full effectiveness, at larger deflections of the aileron or other control surface.

This failure of the sealed internal balance to function efficiently at large deflections of the surface is alleviated and eliminated to a great extent by the improved regulator vanes or flaps 11 and 12, which are hinged to the upper and lower wing surfaces 7 and 8, respectively, being automatically actuated by the aileron movement by engagement of the aileron nose cam portions 13 and 14 with the follower elements 15 and 16 provided on the regulator vanes themselves.

Referring now to the details shown in Fig. 4, in which the trailing portion of the wing W and the lower surface of the nose of the aileron A are shown fragmentarily, the wing trailing portion is indicated at 8 and the pressure paddle or plate is indicated at 10. The lower surface regulator vane is indicated by the numeral 12 and as shown in the full lines in Fig. 4, it is urged upwardly against the nose surface of the aileron A in such a position that the lower nose cam 14 will be engaged by its follower element 16 upon counterclockwise rotation of the aileron. The follower element 16 is attached to the regulator vane 12 and the angle element 18 by means of the rivets 17, comprising a movable assembly which is hingedly mounted at 19 to the trailing portion 8 of the wing W. A spring 20 is attached to the undersurface 6 of the fixed wing at one terminal, and is also attached at its other terminal to the upstanding leg of the angle 18 in such manner that the lower regulator vane assembly 12 is urged upwardly, in the counterclockwise direction, to bear against the leading edge of the aileron A in such manner that its follower 16 will positively engage the cam 14 as the aileron is deflected away from the neutral position shown in this figure.

The spring 20 may preferably be riveted to the upstanding leg of the angle 18 as by the rivet 21, which also forms a contact point for the adjustable stop rod 24. A hat-shaped bracket fitting 22 is preferably riveted as at 23 to the lower surface 8, and its web portion is suitably apertured to receive the sleeve 22a for threaded engagement by the stop rod 24, which may be threadedly rotated for adjustment and retained in its adjusted position by the lock nut 25. It will accordingly be understood that with the lock nut 25 backed off the rod 24 can be rotated in either direction within the sleeve 22a supported by the fitting 22 for determining the point at which the regulator 12 will be stopped as it is drawn upwardly by the spring 20, and when the desired stop position is determined, the lock nut 25 may then be tightened to retain such adjustment. The lower nose cam 14 on the aileron A is preferably provided with laterally extending flanges to receive the attachment screws 28 passing through slotted holes 27 in the flanges of the cam 14 whereby the cam may be adjusted along the nose of the aileron, toward or away from the paddle or plate 10, which may be attached to the aileron nose as by the rivets 26. The aileron nose is preferably part-cylindrical in shape having a radius R which is increased at a predetermined rate by the contoured cam 14.

The operation of the improved pressure regulator vanes or gap controllers is as follows: With the aileron A in the neutral position with respect to the wing W, as shown in Fig. 1, the followers 15 and 16 of the upper and lower regulator vanes 11 and 12 engage the upper and lower nose portions of the aileron, such that the spring 20 within the regulator units draw the vane elements inwardly of the wing, or toward the leading edge of the aileron, such that the gaps between the upper and lower trailing edges of the wing and the leading edge of the aileron are at their smallest predetermined openings. As the aileron is deflected upwardly, as shown in Fig. 2, the follower 15 of the regulator flap 11 continues to ride along the cylindrical portion of the nose, having its axis at the pivot 6 and the radius R, and the normal minimum gap existing in the neutral position is maintained at the upper or pressure side of the upwardly deflected aileron. This has the effect of providing for improved aerodynamic flow at the juncture of the upper surfaces of both the wing and the aileron, while at the same time providing for an adequate transfer or equalization of pressures from above the upper surface to within the upper chamber of the pressure recess. As the aileron A is deflected upwardly as shown in Fig. 2, the lower nose cam 14 in rotating downwardly and outwardly about the axis of the pivot 6, engages the follower 16 of the lower regulator flap 12 causing the same to be deflected downwardly, or in the clockwise direction, against the opposing force of its spring 20. Such downward deflection of the flap 12 about its hinge 19 (to a position as indicated by the dotted lines in Fig. 4) has the effect of materially opening the gap at the lower surface in the region of the reduced or negative pressure and permitting these reduced pressures to be fully exerted within the lower chamber of the pressure balance arrangement. This downwardly deflected position of the lower regulator vane 12 aids materially in permitting the reduced pressures developed beneath the wing, in the case of the upwardly turned aileron of Fig. 2, to be developed and exerted to the fullest extent within the lower pressure chamber of the balance beneath the paddle 10, to thereby increase the pressure differential and assist the pilot in developing the necessary counterclockwise force to oppose the clockwise moment exerted against the extended upper surface of the upwardly deflected aileron.

As the aileron is deflected downwardly as shown in Fig. 3, the regular vanes 11 and 12 operate in the opposite manner, corresponding to the downward deflection of the aileron. In other words, the cam 14 on the lower surface of the aileron is carried upwardly away from the follower 16 on the lower vane 12 which slides along the cylindrical nose surface of the aileron to maintain the minimum gap on the pressure side of the surface. Correspondingly the clockwise or downwardly rotating aileron causes the nose cam 13 on its upper surface to engage the follower 15 in such manner as to rock the vane 11 upwardly, in the counterclockwise direction, about its hinge to thereby increase the gap at the upper surface, on its negative side, to permit full transfer of the reduced or negative pressures from the interior upper portion of the pressure chamber above the paddle 10.

In other words, regardless of the direction in which the control surface may be displaced, the gap is substantially maintained on the pressure side of the control surface while the gap is increased to the desired extent on the side of the control surface on which the pressure is reduced, to thereby more effectively reduce the pressure on the adjacent or negative side of the pressure plate or paddle. In this manner the pressure differential on the opposite sides of the paddle is increased at a predetermined rate depending upon the shape or contour of the nose cams 13 and 14 to provide the desired assistance to the pilot in displacing the control surface. It will be noted that the nose cams 13 and 14 are adjustable along the nose of the aileron, or about the axis of its pivot 6, and that the depth or thickness of the nose cams 13 and 14 also increases in thickness, or has the effect of having the nose surface extend farther away from the axis of the pivot 6. This results in increasing the radius R in such manner that the maximum deflection of the regulator vane is accomplished with the maximum deflection of the control surface to thereby increase the gap on the negative side of the displaced surface proportionately as the angle of deflection of the displaced surface is increased. It will be understood that the regulator vanes 11 and 12 may extend substantially the full spanwise length of the gaps between the trailing edges of the wing and the aileron to control the gap width along the entire length of the gap, whereas the cam and follower elements may be of relatively small dimension in the spanwise direction and a plurality of these elements may be provided at spaced intervals along the span of the gap.

Other forms and modifications of the present invention which occur to those skilled in the art after reading the foregoing description are intended to come within the scope and spirit of the present invention, as more particularly set forth in the appended claims.

I claim:

1. The combination with an airfoil, a control surface hingedly mounted thereon and forming a gap therewith and a pressure balance system cooperatively connected between said airfoil and said control surface, of means arranged for actuation by said control surface and including a vane element movably carried upon said airfoil for increasing the gap between said airfoil and said control surface on the negative pressure side of the displaced control surface as said control surface is displaced.

2. The combination with an airfoil, a control surface hingedly mounted thereon to form a gap therebetween and a pressure balance system cooperatively interconnected between said airfoil and said control surface for facilitating displacement of said surface, of means actuated by said control surface and including a vane element pivotally mounted upon said airfoil for increasing the gap between said airfoil and said control surface on the negative pressure side of the deflected control surface.

3. The combination with an aircraft wing, a control surface hingedly mounted thereon in spaced relation thereto and forming a streamlined continuation thereof with an air gap therebetween and a pressure balance system cooperatively connected between said wing and said control surface, of means actuated in response to deflection of said control surface and including a hinged vane element extendable upon deflection of said control surface for increasing the gap between said wing and said control surface on the negative pressure side of the deflected control surface.

4. In an aircraft wing, a control surface, air gaps between said surface and said wing leading into the interior of an internal pressure balance compartment formed between said surface and said wing, and automatic means for controlling the air gaps into said pressure balance compartment including hinged vane elements mounted upon said wing to make contact with a contoured portion of the surface leading edge and arranged to increase the gap on the negative pressure side proportionately as the control surface is displaced in the opposite direction.

5. In an aircraft wing, a control surface pivotally mounted thereon having an internal pressure balance recess formed between said surface and said wing, air gaps between said surface and said wing leading into the interior of said pressure balance recess, and automatic means for controlling the gaps into said pressure balance recess between said wing and control surface including vane elements hingedly mounted upon said wing in contact with a contoured portion of the control surface leading edge arranged to increase the gap on one side only proportionately as the control surface is deflected toward the opposite side.

6. In an aircraft wing, a control surface pivotally mounted thereon, an internal pressure balance formed between said surface and said wing for facilitating displacement of said control surface, air gaps formed between said surface and said wing leading into the interior of said pressure balance, and automatic means for controlling the gaps into said pressure balance including vane elements movably carried by said wing in sliding contact with the control surface leading edge arranged to be deflected outwardly to increase the gap proportionately on the reduced pressure side as the control surface is deflected toward the opposite side of said wing.

7. In aircraft, a relatively fixed airfoil, a control surface pivotally mounted at the trailing edge of said airfoil and spaced to form a gap therewith, a pressure recess formed in the trailing portion of said airfoil, a pressure seal extending between the leading edge of said control surface and a forward wall of said pressure recess for dividing said recess into pressure differential chambers, and automatic means actuated by said control surfaces for controlling the width of the gap between said airfoil trailing portion and the leading edge of said control surface including a hinged vane element carried by said airfoil and movable in such manner as to increase the gap on one side of the airfoil as the control surface is deflected toward the other side.

8. In aircraft, a relatively fixed wing, a control surface pivotally mounted at the trailing edge of said wing and forming gaps therewith, a pressure recess formed in the trailing portion of said wing, a pressure seal extending between the leading edge of said control surface and a forward wall of said pressure recess for dividing said recess into pressure differential chambers, an automatic means for controlling the width of the gaps between said wing trailing portion and the upper and lower surfaces of said control surface including vane elements movably carried by said wing and actuating connections positioned between said vane elements and said control surface in operative association with both the vane elements and the control surface whereby the said connections are adapted to impart movement to said vane elements in response to movement of said control surface in such manner as to increase one of said gaps as the deflection of said control surface is increased with respect to said wing.

9. In aircraft, a relatively fixed wing, a control surface pivotally mounted at the trailing edge of said wing and forming a gap therewith, a pressure recess formed in the trailing portion of said wing, a pressure seal extending between the leading edge of said control surface and a forward wall of said pressure recess for dividing said recess into pressure differential chambers, displacement of said surface creating increased and lowered pressures on the opposite sides of said surface, and automatic means actuated in response to said displacements for increasing the width of the gap between said wing trailing portion and the leading edge of said control surface at the lowered pressure side, said means including a hinged vane element movably carried by said wing in such manner as to increase said gap as the angular displacement of said control surface is increased with respect to said wing.

10. The combination with an airfoil, a control surface hingedly mounted thereon and forming a gap therewith and a pressure balance system cooperatively connected between said airfoil and said control surface, of means in contact with said control surface and including a vane element movably carried upon said airfoil for increasing the gap between said airfoil and said control surface on the negative pressure side of the displaced control surface as said control surface is displaced.

11. The combination with an aircraft wing, a control surface hingedly mounted thereon in spaced relation thereto and forming a streamlined continuation thereof with an air gap therebetween and a pressure balance system cooperatively connected between said wing and said control surface, of means in contact with said control surface and including a hinged vane element carried by said wing and extendable upon deflection of said control surface for increasing the gap between said wing and said control surface on the negative pressure side of the deflected control surface.

12. The combination with an airfoil, a control surface hingedly mounted thereon and forming a gap therewith and a pressure balance system cooperatively connected between said airfoil and said control surface, of means arranged for actuation concurrently with said control surface and including a vane element movably carried upon said airfoil for increasing the gap between said airfoil and said control surface on the negative pressure side of the displaced control surface as said control surface is displaced.

13. In an aircraft wing, a control surface, air gaps between said surface and said wing leading into the interior of an internal pressure balance compartment formed between said surface and said wing, and automatic means for controlling the air gaps into said pressure balance compartment including hinged vane elements mounted upon said wing and arranged for actuation in response to movement of said control surface to increase the gap on the negative pressure side proportionately as the control surface is displaced in the opposite direction.

EDWARD J. HORKEY.

References Cited in the file of this patent

UNITED STATES PATENTS

| Number | Name | Date |
|---|---|---|
| 2,368,059 | White | Jan. 23, 1945 |
| 2,551,495 | Lambert | May 1, 1951 |

FOREIGN PATENTS

| Number | Country | Date |
|---|---|---|
| 441,603 | France | May 30, 1912 |